Oct. 11, 1932.　　　A. DEMOCRATIS　　　1,882,181
MEANS FOR CONVERTING AND TRANSMITTING TORQUES
Filed Oct. 16, 1930　　7 Sheets-Sheet 1

Fig.1.

Inventor
Achille Democratis
By Watson E. Coleman.
Attorney.

Oct. 11, 1932.  A. DEMOCRATIS  1,882,181
MEANS FOR CONVERTING AND TRANSMITTING TORQUES
Filed Oct. 16, 1930  7 Sheets-Sheet 2

Fig.2.

Inventor
Achille Democratis
By Watson E. Coleman
Attorney

Oct. 11, 1932. A. DEMOCRATIS 1,882,181
MEANS FOR CONVERTING AND TRANSMITTING TORQUES
Filed Oct. 16, 1930 7 Sheets-Sheet 3

FIG.3.

Inventor.
Achille Democratis
By Mateor E. Coleman
Attorney

Oct. 11, 1932.  A. DEMOCRATIS  1,882,181
MEANS FOR CONVERTING AND TRANSMITTING TORQUES
Filed Oct. 16, 1930   7 Sheets-Sheet 5

Inventor
Achille Democratis
By Watson E. Coleman
Attorney

Oct. 11, 1932. A. DEMOCRATIS 1,882,181
MEANS FOR CONVERTING AND TRANSMITTING TORQUES
Filed Oct. 16, 1930 7 Sheets-Sheet 7

Inventor
Achille Democratis
by Watson E. Coleman
Attorney

Patented Oct. 11, 1932

1,882,181

UNITED STATES PATENT OFFICE

ACHILLE DEMOCRATIS, OF LONDON, ENGLAND

MEANS FOR CONVERTING AND TRANSMITTING TORQUES

Application filed October 16, 1930, Serial No. 489,162, and in Great Britain October 28, 1929.

This invention relates to means for converting torque and transmitting said torque from a driving member to a driven member of the kind in which the torque and angular velocity of the driven member are automatically varied, being functions of the load on the said driven member.

According to the present invention, means for converting and transmitting torque comprise converting means mounted on a rotatable driven member and actuated by a driving member to produce a force alternating at a frequency proportional to the speed of the driving member relative to the driven member and means adapted to allow free operation of said converting means during those periods in which said force operates in the one of its directions while offering resistance to the operation of said converting means during those periods in which said force operates in the other of its directions in order that two consecutive and similarly acting torques may be applied to the driven member for each complete cycle of the force.

The invention further consists in means for converting and transmitting torque comprising a driving member, a driven member, driving means actuated from the driving member and converting means operated by the driving means to produce a force alternating at a frequency proportional to the speed of the driving member relative to the driven member, the positive values of said force being directly applied to the driven member at a point spaced from the axis of rotation thereof and the negative values of said force being so applied to a resistant point that the driving means reacts on the driven member at a point spaced from the axis of rotation thereof, in order to produce two consecutive and similarly acting torques upon the said driven member for each complete cycle of said force.

The alternating force referred to above may be produced by the rotation or oscillation of an unbalanced inertia mass about a pivotal point or by the combination of the oscillation of one unbalanced inertia mass about a pivotal point and the rotation of another unbalanced inertia mass in an elliptical or other path, the said inertia masses being driven in all cases from the driving member through suitable means.

More specifically stated the driving and driven members preferably include a driving shaft in alignment with a driven shaft upon which latter is keyed a disc or the like carrying at a distance from its axis of rotation a pivot about which a rotating or oscillating inertia mass is adapted to be swung, said pivot constituting the point at which the positive values of the alternating force and the positive reaction due to the application of the negative values of the said force to a resistant point are respectively applied to the driven member.

According to another feature of the present invention the resistant point, to which the negative values of the alternating force are applied, is adapted to yield to a limited extent under the action of the impressed force and the motion of the point thus produced is converted into an additional impulse on the driven member in the positive direction, i. e., in the direction of rotation of the said driven member.

Figure 1:
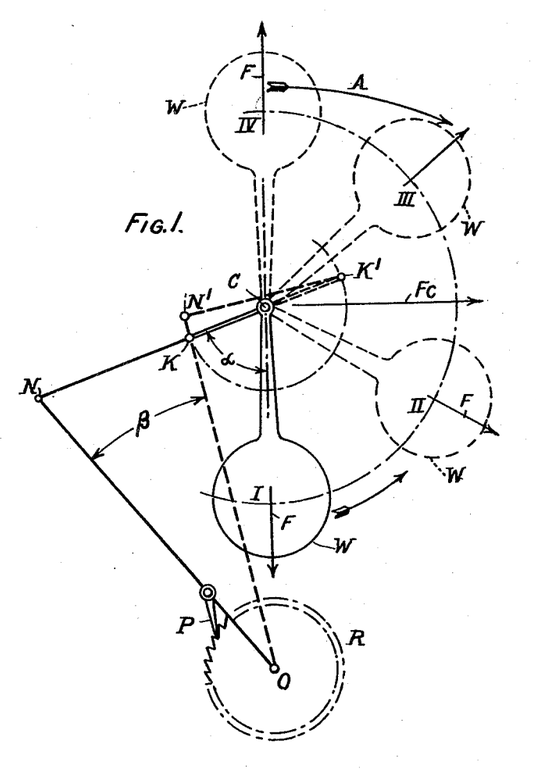
Figs. 1, 2 and 3 are diagrams illustrating the theoretical consideration of the basic principles of the improved torque converter and transmitter according to this invention.
Figure 2:
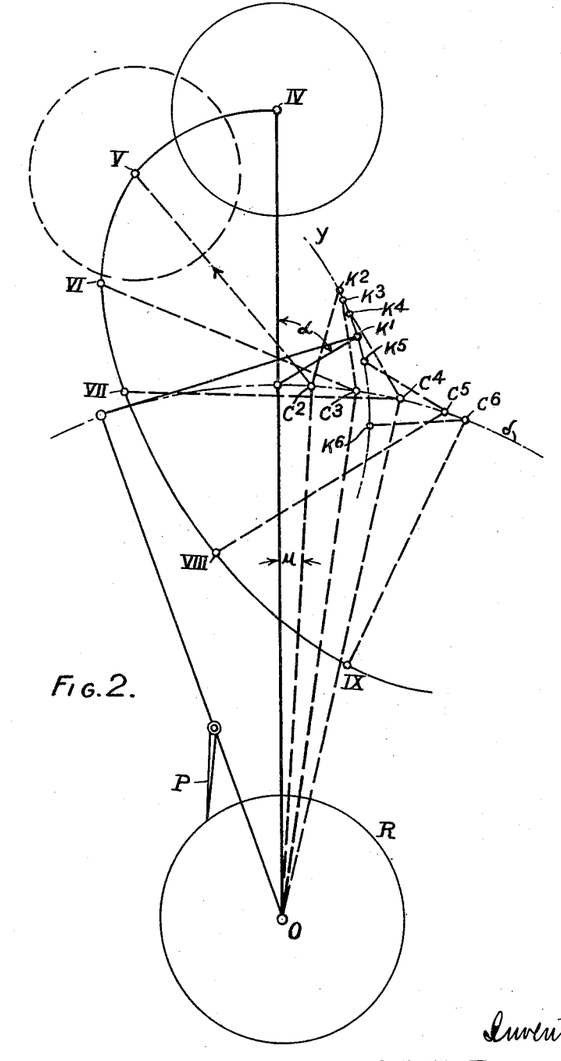
Figure 3:
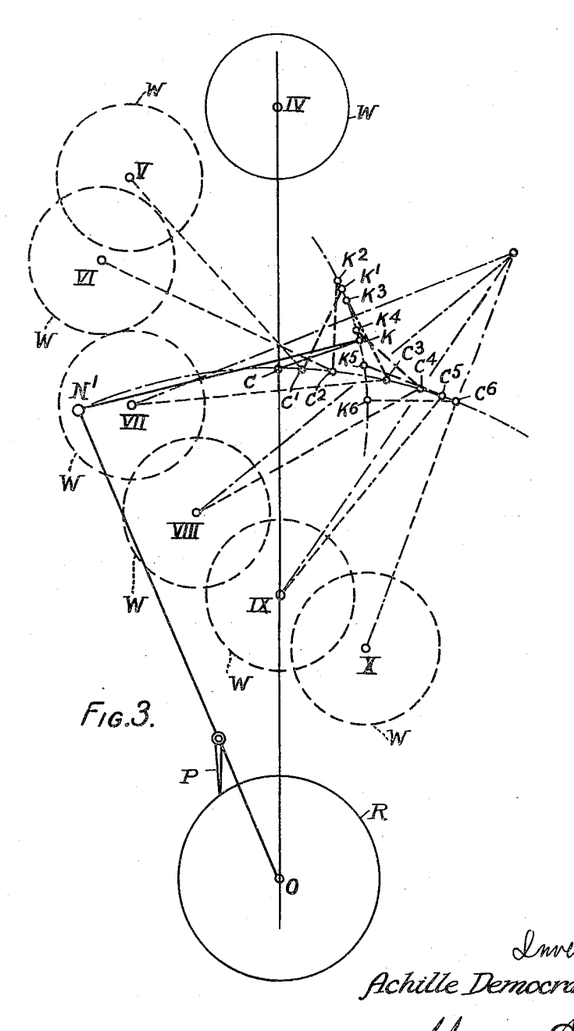

In order that the invention may be clearly understood the basic principles underlying the same will first be briefly considered from the theoretical standpoint, reference being made to the accompanying diagrams (Figs. 1 to 3).

The fundamental principle upon which the novel torque converter and transmitter is based may be outlined as follows:—

An unbalanced inertia mass is caused to rotate by means of a rotating driving member and the centre of rotation of the mass is altered during and in definite relationship to such rotation so that two consecutive and similarly acting torques are produced upon a rotatable driven member for each complete rotation of the inertia mass.

The one torque may be produced upon the driven member by an arrangement whereby the centre of rotation of the inertia mass is disposed at a point on the driven member spaced from the axis of rotation thereof during one half of the complete rotation of said mass so that the centrifugal force due to the swinging of the mass about said point will apply a turning moment to the driven member.

In order to produce the second torque on the driven member the inertia mass is caused to rotate about a different centre during the second half of the complete rotation of the mass so that, on the one hand, the centrifugal force due to the swinging of the mass about said new centre, which centrifugal force is substantially opposite in direction to that utilized for producing the first-mentioned turning moment, is applied to a fixed or relatively fixed point or points and is absorbed thereby or utilized in producing a forward impulse on the driven member respectively and, on the other hand, the means producing the rotation of the mass about said centre is caused to react upon a point on the driven member spaced from the axis of rotation thereof in order to apply a turning moment to said driven member of the same sense as the first mentioned turning moment.

In amplification of the above generally stated principle an example will now be considered theoretically with reference to the diagrams, Fig. 1 representing an unbalanced inertia mass W rotated in an anti-clockwise direction about a pivot C on a driven member the axis of rotation of which is indicated at O. The mass W, which is driven from a driving member by suitable means not shown in the drawing, has integrally connected thereto at its pivoted end a crank arm C K which forms an angle α with the line passing through the centre of gravity of the mass W and the pivot C.

A connecting rod K N is pivotally connected by its one end to the free end of the crank arm K and by its other end to the one end N of a rocking lever N O the other end of which pivots about the axis of rotation O of the driven member. This lever N O is connected to one element of a device which allows free movement of the lever in the one direction but offers resistance to the movement of the lever in the other direction, a pawl and ratchet mechanism, P, R, having been indicated for the sake of simplicity. The pawl P is pivoted on the lever N O and the ratchet R is fixed on some stationary part such as a casing enclosing the gear, the arrangement being such that the lever N O is free to move in the clockwise direction but is held stationary when it tends to move in the anti-clockwise direction.

The angle α is preferably so chosen that when the mass W is in the position marked I the rocking lever N O is at the outer end of its travel, while, if it is assumed that the point C is stationary, a rotation of the crank arm C K through 180° rocks the lever N O through an angle β to the position N' O.

When the mass W starts to rotate from the position marked I, in the anti-clockwise direction, the rocking lever N O commences to move towards the position N' O, being free to move in this direction as already set out. Assuming that the combined mass of the connecting rod, rocking lever and pawl is very small, it is obvious that the only forces to be considered are those produced by the rotation of the mass W around the pivot C.

Due to such rotation there is produced a centrifugal force F which has a component $F_c$ in the direction at right angles to the radius O C of the driven member, the value of $F_c$ being given by $$F_c = F \cos FF_c$$

This component $F_c$ acts on the driven member at C to produce a torque $F_c$, O C tending to rotate the driven member in the direction of the arrow A.

Hence during the rotation of the mass W from the position marked I to the position marked IV there is produced a torque on the driven member the value of which varies from nil to a maximum and again to nil and is proportional to the square of the speed of the mass W.

Now when the mass W continues to rotate past the position marked IV the rocking lever N O tends to move back to its initial position but is prevented from so doing by the pawl and ratchet mechanism P, R. The outer end N of the lever N O is therefore held stationary at the point N' (see Fig. 2) but as the crank CK, now positioned at CK' is still being rotated from the driving member the points C and K must move. The point K is constrained to move upon the arc of a circle γ having its centre at N' and its radius equal to the length of the connecting rod KN, while the pivot C is constrained to move upon the arc of a circle δ having its centre at O and its radius equal to the distance of the pivot from the axis of rotation of the driven shaft, i. e. the distance OC.

Assuming that W has rotated from the position IV through a small angle to the position V, then the end K of the crank will have moved along the arc γ to the position K², and the pivot C will have moved along the arc δ to the position C². The pivot C has therefore been displaced by a leverage reaction to the position C² and as the pivot is fixed on the driven member this latter has been turned through an angle μ. If the positions of the pivot C and end K of the crank arm are plotted for the positions of the mass W indicated by IV, V, VI ... IX (Fig. 2), the points C' and C⁶ and K' to K⁶ result. Tracing a smooth curve through the points V, VI ... IX, representing the successive positions of the centre of gravity of the mass W it will be seen that the said centre of gravity describes a cycloidal curve. Now the instantaneous centre of rotation of the mass W when this mass is in the position IV is situated at C but when the mass rotates through its cycloidal path the instantaneous centre of rotation tends towards the point S (Fig. 3). The radius joining the centre of gravity of the mass W with the instantaneous centre of rotation S always passes between the points K and C. Now it is known that the centrifugal force produced by the rotation of a mass always acts along a line passing through the instantaneous centre of rotation and normal to the path described by the centre of gravity of the rotating mass. Hence in the case under consideration the centrifugal force produced by the rotation of the mass W acts along the instantaneous radius of rotation. As this radius passes between the points K and C the force may be resolved into a component acting in a direction parallel to the connecting rod KN and a component acting on the pivot C along the crank arm CK. The component acting in a direction parallel to the connecting rod may be replaced by a pair of parallel forces one of which acts along the connecting rod and the other of which acts on the pivot C in a direction parallel to said rod. Now it will be seen that the force acting along the connecting rod KN will be applied to the point N of the stationary rocking lever NO whilst the two forces acting on the pivot C produce a resultant force the direction of which is substantially radial to the driven member. Hence the centrifugal force due to the rotation of the mass W from the position IV to the position I (Fig. 1) does not directly produce a torque on the driven member. The means producing the rotation of the mass W however reacts on the driven member during this half rotation of said mass to produce a torque on the driven member tending to rotate same in the direction of the arrow A (Fig. 1).

During a complete rotation of the mass W therefore there are produced on the driven member two consecutive and similarly acting torques, the first of which is obtained by the direct application of the centrifugal force due to the rotation of the mass about one centre to the driven member at a point thereon spaced from the axis of rotation thereof and the second of which is obtained by absorbing the centrifugal force due to the rotation of the mass about a fresh centre, whether in doing work or not, and causing the means rotating said mass to react upon the driven member at a point spaced from the axis of rotation thereof.

It will be understood that the characteristic of the device will be very similar to a hyperbola, which renders it highly suitable for application to motor vehicles.

Although in the above description the mass W has been described as rotating the same results can be obtained if the mass W is oscillated about its pivot C.

Furthermore the pawl and ratchet mechanism P, R would preferably in practice be replaced by a device, such as hereinafter described, by means of which the force applied to the rocking lever is converted into a forward impulse on the driven member.

More than one inertia mass system may be mounted on the driven member and, in the case where two systems are employed, the pivots C thereof would be symmetrically disposed on a diameter of the driven member on opposite sides of the centre thereof, the masses being operated in unison and co-operating with a common rocking lever of the nature hereinbefore indicated.

The inertia mass or masses is or are preferably so disposed and dimensioned that, for a predetermined forward speed of the driven member, the centrifugal force produced by the rotation of said mass or masses about the axis of rotation of the driven member will be such as to hold the mass or masses against movement, relatively to the driven member, this effecting clutching and ensuring a direct drive from the driving member to the driven member.

Furthermore the direction of rotation of the driven member may be reversed, whilst the inertia mass or masses are still rotating in the same direction, in a manner set out more fully hereinafter, and it will be seen that, while direct drive will not take place in reverse, the inertia mass or masses will rotate more rapidly thus producing increased torque.

Reference has been made in the above description to the fact that the rocking lever is connected with one element of a device which allows free movement of the lever in the one direction but offers resistance to the movement of the lever in the other direction and a pawl and ratchet mechanism is indicated as the simplest form of this device.

Other unidirectional devices however could be employed and some examples of constructions which are readily reversible in action, will now be described with reference to the diagrammatic drawings of Figs. 4 to 6.

Figure 4:
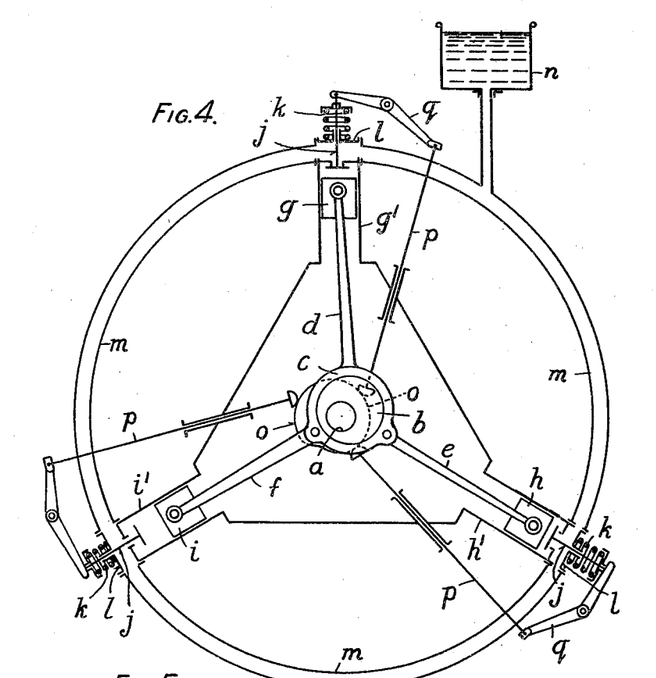
Fig. 4 is a diagrammatic view of a reversible unidirectional device for use with the device of the present invention.

The end of the rocking lever NO remote from the connecting rod KN (considering the diagram of Fig. 1) is rigidly connected with a sleeve, indicated at $a$ in Fig. 4, which is rotatable about the same axis as the driven member (not shown) and an eccentric $b$ is in turn rigidly connected with said sleeve.

A ring $c$ forming the big end of a connecting rod $d$ is freely rotatable on said eccentric and has pivotally connected thereto two further connecting rods $e$ and $f$ respectively. The small ends of the connecting rods $d$, $e$ and $f$ are connected in the usual way to pistons $g$, $h$ and $i$ respectively, working in fixed cylinders $g'$, $h'$ and $i'$. In the head of each cylinder is mounted a non-return valve $j$ opening inwardly into the cylinder space and urged on to its seat by a spring $k$, these valves controlling the communication of the respective cylinder spaces with jackets $l$ which are mounted on the cylinder heads and are interconnected by suitable piping $m$.

The jackets $l$ and their associated piping $m$ are filled with a liquid such as oil, from a reservoir $n$, and it will be seen that during the movement of any one piston, say $g$, in the inward direction, i. e. towards the sleeve $a$, oil will be sucked into the corresponding cylinder $g'$ through the nonreturn valve $j$ but, should the piston tend to reverse its direction of movement then the valve $j$ will close and such reverse movement of the piston $g$ will be prevented by the body of oil already sucked into the cylinder $g'$.

As it is only desired to render the pistons irreversible in the one direction, the inward direction, and to allow them free movement in the outward direction, the valves $j$ are controlled by a cam $o$ on the central sleeve $a$, through appropriate push-rods $p$ and rocker arms $q$, so that each valve is held open against the action of its spring $k$ during the outward stroke of the corresponding piston.

Now it will be seen that a movement of the sleeve $a$ in the clockwise direction, produced by a corresponding movement of the rocking lever NO of Fig. 1, will cause the pistons $h$ and $i$ to travel outwardly and the piston $g$ to travel inwardly. Owing to the shape of the cam $o$, however, the valves $j$ associated with the cylinders $h'$ and $i'$ are held open during this outward movement of the pistons $h$ and $i$, whilst the valve $j$ associated with the cylinder $g'$ is only subject to the influence of its spring $k$ during the inward movement of the piston $g$.

Oil will therefore be expelled from the cylinders $h'$ and $i'$ into the piping $m$, from which oil will be sucked into the cylinder $g'$ through the non-return valve $j$ thereon. The movement of the sleeve $a$ in the clockwise direction will therefore be free and unimpeded.

When, however, an initial reversal of the direction of movement of the rocking lever NO of Fig. 1 tends to move the sleeve $a$ in the anti-clockwise direction, the valve $j$ on the cylinder $g'$ will close under the action of its spring $k$ and the piston $g$ will be prevented from travelling outwardly. Hence such reverse movement of the sleeve $a$ will be prevented and the rocking lever NO will be held stationary.

It will be understood that the pistons $g$, $h$ and $i$ become operative in turn in preventing reverse movement of the sleeve $a$ as the latter rotates with the driven member relatively to the fixed cylinders $g'$, $h'$ and $i'$.

By means of the device just described, the movements of the rocking lever due to the rotation of the inertia mass will be unimpeded in the one direction but will be prevented in the other direction. Hence the device described functions as a hydraulic ratchet mechanism.

It will be obvious that, by providing a second valve-controlling cam, of similar shape to that marked $o$, on the central sleeve $a$, but arranged to operate in the inverse sense and by rendering the cam $o$ inoperative, the action of this device may be reversed, i. e. those movements of the rocking lever which were formerly unimpeded are now prevented and vice versa.

This is of importance, for such reversal brings about a reversal in the direction of rotation of the driven member in the following manner:—

The half-rotation of the mass W (Fig. 1) from the initial position marked I no longer occurs with free movement of the rocking lever as this will now be held stationary by the reversed ratchet device whenever it tends to move in the clockwise direction. Hence the mass W now rotates about a fresh centre to produce a reactive force on the pivot C tending to turn the driven member in a direction opposed to that indicated by the arrow A.

Again, during the succeeding half-rotation of the mass W the rocking lever is now free to move and the centrifugal force due to such rotation acts on the pivot C to produce a torque on the driven member again tending to turn the latter in the direction opposite to that indicated by the arrow A. It will be seen that the direction of rotation of the driven member is thus reversed whilst the mass W still rotates in the anti-clockwise direction.

A further point of importance is the fact that should the unidirectional device be rendered inoperative, i. e. should the pistons be rendered free to move in either direction by arranging that the non-return valves are held open on both strokes of the pistons, the rocking lever will be free to move in both directions also and the only effect that the rotation of the mass W will have on the driven member will be to apply two equal and oppositely acting torques to the driven member for each complete rotation of said mass.

The torque converter and transmitter may then be said to be in "neutral" as no rotation is imparted to the driven member.

Now referring back to the unidirectional device shown in Fig. 4, embodying the pistons and cylinders etc., the construction described is necessarily complicated and the use of oil to prevent reverse motion of the pistons is open to serious objections.

Figure 5:
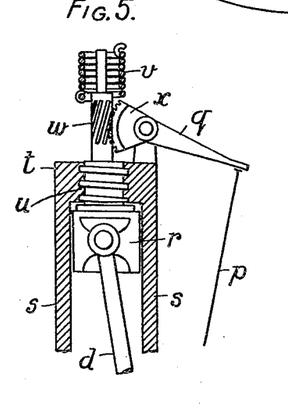
Fig. 5 is a fragmentary sectional view of a modification of such unidirectional device.

The same results may be obtained however if each of the units comprising a piston, cylinder, oil jacket and non-return valve is replaced by an arrangement such as shown in Fig. 5.

Each of the connecting rods $d$, $e$ and $f$, only $d$ being shown, is connected to a cross-head $r$ working in guides $s$ which are connected at one end by a nut $t$ in which works a non-reversible screw $u$ of suitable pitch. This screw is urged by a torsion spring $v$ to rotate in a direction such that the screw follows up the crosshead when this moves inwardly towards the central sleeve $a$.

In order that the necessary free movement may be allowed to the crosshead in the outward direction at the desired periods, the screw $u$ is suitably controlled from the cam $o$ on the central sleeve $a$ (shown in Fig. 4), this cam actuating the screw by means of the push-rod $p$ and rocker arm $q$ to unscrew it through the nut $t$ against the action of the spring $v$. This is effected by forming the screw $u$ with an extension $w$ having helical teeth which are engaged by corresponding teeth on the arcuate face of the segmental inner end $x$ of the rocker arm $q$.

It is not proposed to discuss this form of reversible ratchet mechanism at length as it will be obvious that it corresponds in action to that shown in Fig. 4.

Figure 6:
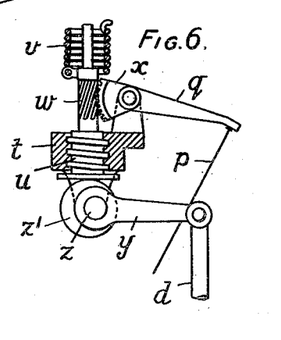
Fig. 6 is a view similar to that of Fig. 5 showing a further improvement in the unidirectional device.

Yet a further improvement may be made in this mechanism, however, if, as shown in Fig. 6, the crossheads $r$ are each replaced by a rocking lever $y$ pivotally connected with the outer end of the corresponding connecting rod ($d$ for example) and arranged to rock about a fixed pivot $z$, an eccentric $z'$ being secured on the lever $y$ at the pivoted end. The periphery of the eccentric $z'$ is arranged to work against the end face of a non-reversible screw $u$, such as already described, which is screwed into a fixed nut $t$ and is urged to follow the periphery of the eccentric $z'$, when the latter rotates, by the pressure of the spring $v$.

Cam actuated means $p$, $q$, $x$, $w$, are again provided for unscrewing the screw $u$ against the action of its spring $v$ at the correct moments, it being understood that only very small movements are concerned and that a fraction of a complete rotation of the screw $u$ will suffice to produce the effect desired.

The mechanism just described forms an efficient reversible ratchet mechanism and it will be understood that it could be employed to control the operation of the rocking lever associated with the rotating inertia mass of the torque converter.

Devices such as above described, however, have the disadvantage in practice that they are always in motion even when not required to act as unidirectional devices, i. e. during direct drive.

It may be preferred to employ a novel device for controlling the operation of the rocking lever which allows a limited movement to the rocking lever during those periods in which it would be held stationary were a ratchet mechanism employed and which converts this movement of the lever into an impulse on the driven member tending to assist the rotation of same.

This novel device comprises a resistor member or element on which the force transmitted by the rocking lever is concentrated to produce a reverse rotation, a "reacting element" which converts the negative or reversed rotation of the resistor element into a thrust which may be radial or parallel to the axis of the device and a "reversing" member which converts the thrust into a positive or forward rotation. This positive rotation is transmitted by suitable means to the driven member.

Figure 7:
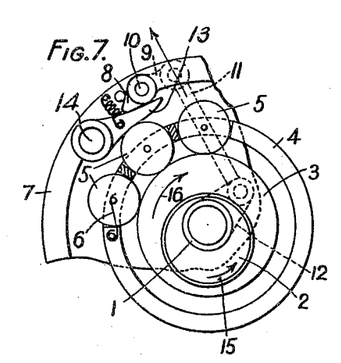
Fig. 7 is a fragmentary view of one form of a novel device intended for employment in the stead of the unidirectional devices of Figs. 4 to 6.

In one construction of such a device, illustrated in Fig. 7 by way of example only, the resistor member or element comprises a sleeve 1 freely rotatable on the driving shaft (not shown) and rigidly connected with the inner end of the rocking lever (also omitted from the figure). On the said sleeve is rigidly secured the reacting element which comprises an eccentric sheave 2 freely rotatable in an eccentric bearing formed in a disc 3 which constitutes the reversing member. Said reversing member 3 is connected to the driven member (not shown) to rotate therewith and is surrounded by a stationary annular cage 4 concentric with the driving shaft and carrying rollers 5 or the equivalent (only three of which are shown) which contact with the periphery of the disc 3 constituting the reversing member and can slide radially to the cage 4 in radial slots, being urged into contact with said periphery by means of springs such as indicated at 6.

An inertia fly-wheel 7 is freely rotatable on the sleeve 1 forming the resistor member and is provided with means for engaging with one or other of the loosely mounted spring-pressed rollers 5 to press same into close engagement with the periphery of the reversing member 3. Said means may comprise a cam member 8 forming an extension of a rocking lever 9 pivoted at 10 on the rim of the fly-wheel 7 and actuated by a link 11 from a crank arm 12 mounted on the sleeve 1 carrying the reacting element to press an arm 13 pivoted at 14 on the fly-wheel 7 into close engagement with the roller 5 opposite which the arm 13 happens to be positioned when the link 11 is operated.

The eccentric reacting member 2 is so arranged in relation to the eccentric reversing member 3 that, when the eccentrics are in their neutral position as shown, the periphery of the reversing member 3 is concentric with the sleeve 1 forming the resistor member and thus with the driving shaft.

When as above described, the rocking lever (not shown) has the centrifugal force due to the swinging of the inertia mass about the new centre impressed upon it through the connecting rod, the resistor member 1 together with the reacting member 2 rotates in a reversed direction relatively to the reversing member 3, as shown by the arrow marked 15, the reversing member 3 and the inertia fly-wheel 7 both rotating with the driven member in the direction of the arrow marked 16.

The first part of this relative rotation actuates the link 11 to cause the arm 13 pivoted on the fly-wheel 7 to hold one of the rollers 5 surrounding the reversing element 3 stationary in close contact with the latter, said roller acting upon a suitable point on the reversing element.

The further rotation of the eccentric reacting element 2 relative to the reversing element 3 now acts to produce a radial thrust on the latter directed towards the stationary roller 5. Hence the portion of the reversing element 3 disposed between the stationary roller 5 and the reacting element 2 is subjected to a squeezing action and as the said portion tapers in a direction opposed to that in which the driven member is rotating, this squeezing action is resolved into a positive motion of the said portion and hence of the reversing member.

There is thus obtained a positive rotation of the reversing member 3 for a negative rotation of the reacting member 2 and resistor member 1, the terms positive and negative, as will be understood, being relative only and referred to the direction of rotation of the driven member.

On the reversed motion of the rocking lever during the swinging of the inertia mass through the subsequent half of its complete rotation, a positive rotation is imparted to the reacting member 2 which first actuates the cam member 8 on the fly-wheel 7 to release the roller 5 engaged by the presser arm 13 and then rotates the reacting member 2 relatively to the reversing member 3 to bring it into the position in which it can again produce a squeezing action on said reversing member when the force due to the swinging of the lever system is again impressed on the resistor member 1.

It will thus be seen that there is alternately a conversion of the negative or reverse rotation of the resistor member into a positive rotation of the reversing member and a free forward rotation of said resistor member.

As the angle of oscillation of the rocking lever is limited the angle of oscillation of the reacting member 2 is also limited and this member is therefore always in a position to effect the reversing of the negative motion of the resistor element 1 into a positive motion of the driven member.

Although reference has been made to an inertia fly-wheel 7 in describing the above novel device it must be understood that such fly-wheel is not essential to the operation of the device which, furthermore, may be constructed in any one of a number of ways provided that the conditions laid down above obtain, i. e. the reverse rotation converted in turn into a suitable thrust and a positive rotation.

Figure 8:
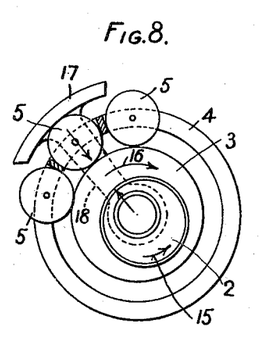
Fig. 8 is a similar view of another construction of said novel device.

For example, instead of the fly-wheel, there may be employed, as shown in Fig. 8, an arcuate cam or abutment 17 carried by a radial arm 18 resiliently connected to the driven member (not shown) and adapted to rotate around the rollers 5 arranged around the periphery of the reversing element 3. This cam or abutment 17, as will be understood, holds the required roller 5 of the series in contact with said reversing element during the period in which the radial force is being exerted upon the same.

It will be appreciated that the operation of the above-described device comprising two eccentrics is rendered possible by the fact that a stationary abutment is provided in contact with the periphery of the reversing element, at the desired point, during those reverse movements of the rocking lever which it is desired to convert into forward impulses on the driven member. In the forms described this abutment comprises one of the rollers in a stationary cage surrounding the reversing element, the other rollers being free to move radially in said cage.

The same result can be obtained, however, if the stationary abutment is provided by part of a ring surrounding the reversing member, which latter is freely rotatable within said ring, and such a construction will now be described.

A ring is freely mounted on the reversing member and has connected thereto a number of connecting rods, preferably three, one of which is integral with the ring and the others of which are pivotally connected therewith.

These connecting rods are arranged radially to the ring, somewhat in the manner of the connecting rods of a radial aero engine, and at their outer ends are each pivotally connected with a rocking lever having an eccentric boss working against a non-reversible screw in the manner already defined in connection with the form of reversible ratchet device already described in connection with Fig. 6.

It will be seen therefore that the ring, when it tends to move as a whole in a direction radial to the reversing member, will be held against such movement if the direction of movement corresponds to a movement of one of the connecting rods in the locking direction of the ratchet device, whilst being free to move in the opposite direction.

Hence a movement of the rocking lever which tends to increase the total eccentricity of the reactor member and reversing member in such a sense that the ring is urged in such locking direction will be converted into a radial thrust on the reversing member in a similar manner to that described above and a rotation of the reversing member in the positive direction will result.

Movement of the rocking lever in the opposite direction, i. e. in a direction tending to reduce the total eccentricity, will meet with no resistance as the ring will now move in the unlocking direction of the ratchet device.

As before described, the ratchet device may be reversed or rendered inoperative in order to produce those conditions necessary for the reversal of the direction of rotation of the driven member or for the cessation of rotation of the latter, respectively.

A complete torque converter and transmitter constructed in accordance with the invention will now be described with reference to Figs. 9 to 12 of the accompanying drawings.

Figure 9:
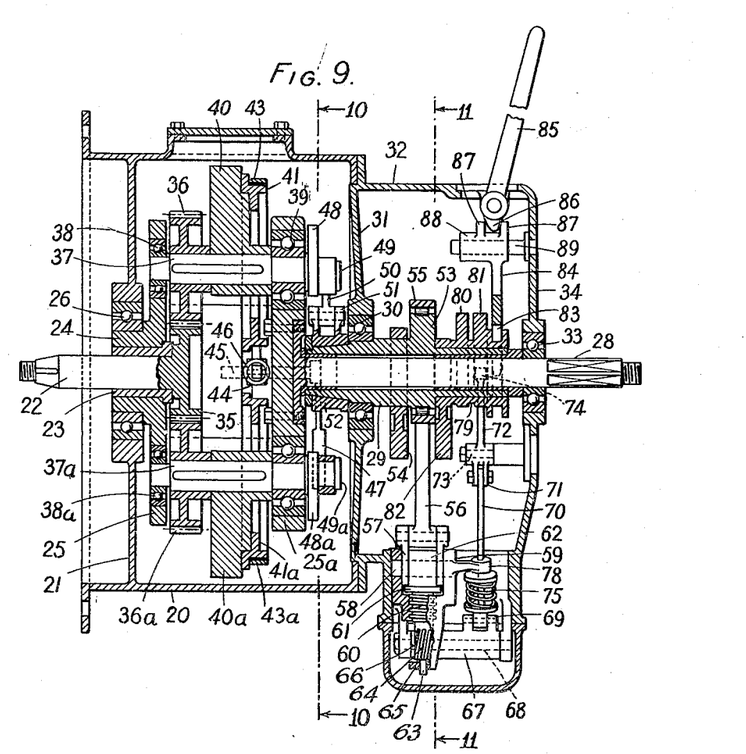
Fig. 9 is a longitudinal vertical section of a practical construction of the complete gear according to the invention.
Figure 10:
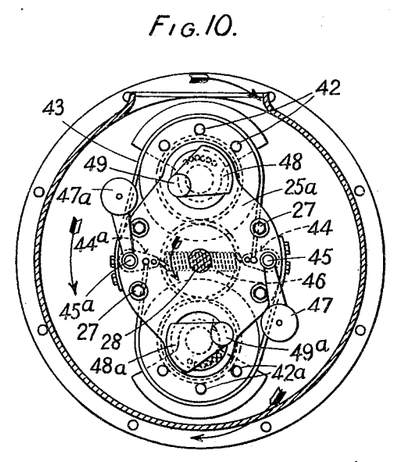
Fig. 10 is an end view thereof taken on the line 10—10 of Fig. 9.

As shown in Figs. 9 and 10 a stationary casing 20, of substantially cylindrical form, is formed with a transverse wall 21 supporting at its centre a driving shaft 22, adapted to be connected to a suitable prime mover. This shaft 22 is freely rotatable within a bush 23 upon which is rotatably mounted a tubular extension 24 of the one section 25 of a rotor member 25, 25a, this extension 24 being mounted in a ball bearing 26 in the wall 21 of the casing.

The rotor member comprises two sections 25, 25a bolted together by means of bolts 27 (Fig. 10) so that there is an intermediate space between them for housing the rotating masses of the gear. The section 25a remote from the driving shaft 22 has secured thereto centrally of its outer face the flanged end of a driven shaft 28 and this shaft is freely rotatable within a sleeve 29, to be hereinafter described, upon which is secured the inner race of a ball bearing 30, the outer race of which is secured in a central aperture in a transverse wall 31 formed integrally with an auxiliary casing 32 secured to the casing 20 to form an extension thereof. Adjacent its outer end the shaft 28 is mounted in a ball bearing 33 disposed centrally of the outer end wall 34 of the auxiliary casing 32.

It will be seen that the driving and driven shafts 22, 28 are in alignment and free to rotate relatively to the casings 20, 32 and also to each other.

On the inner end of the driving shaft 22, where this projects into the intermediate space between the sections 25, 25a of the rotor member, is secured in any suitable manner a toothed gear-wheel 35 adapted to mesh with similar gear-wheels 36 and 36a arranged, respectively, above and below the gear-wheel 35. These gears 36, 36a, are keyed on short shafts 37, 37a respectively, each of these shafts extending parallel to the main longitudinal axis of the gear and being mounted rotatably in the rotor member 25, 25a.

As the gear shown comprises two similar sets of parts one associated with the shaft 37 and the other associated with the shaft 37a, it is proposed to simplify the description thereof by referring only to that set of parts associated with the shaft 37, the reference numerals employed being applied, with the addition of the index a, to the corresponding parts of the other set.

The shaft 37 is rotatably mounted, by its end disposed adjacent the driving shaft 22, in a ball bearing 38 carried in the upper outer end of the section 25 of the rotor member and, adjacent its other end, is rotatably mounted in a ball bearing 39 carried in the corresponding end of the section 25a of the rotor member. Intermediate of these bearings 38, 39 the shaft 37 has keyed thereon an unbalanced weight 40 of sector shape, as shown more clearly in Figs. 10 and 11, and a flanged brake drum 41 is secured as by screws 42, to said weight so as to present a braking surface which is concentric with the shaft 37.

A brake band 43 is secured by its one end to the periphery of the rotor section 25a (as shown in Fig. 10) at a point disposed midway between the outer ends thereof, this band extending over the brake drum 41 to be secured by its other end to a rocking arm 44 disposed between the rotor sections and keyed on a short shaft 45 rotatably mounted by its ends in the said rotor sections 25, 25a. The point at which the brake band is secured to the rocking arm 44 is intermediate of the ends thereof, the one of said ends being mounted on the shaft 45 and the other end being secured to the one end of a spiral tension spring 46 of which the other end is secured to the corresponding rocking arm 44a of the other brake band 43a (see Fig. 10).

On the end of the shaft 45 remote from the driving shaft 22 is rigidly secured an unbalanced mass 47 which is normally held by the action of the spring 46 in the position shown in Fig. 10.

Referring back to the shaft 37, the end of this which projects beyond the bearing 39 in the rotor section 25a has secured thereon a balanced crank arm 48, the pin 49 of which forms the pivot for one end of a connecting rod 50 the other end of which is pivotally connected to the outer end of a rocking lever 51 formed integrally with a central hub 52 rigidly mounted on the sleeve 29 above referred to. The form of connection shown in Fig. 9 comprises a tapered bore in said hub 52 fitting over the tapered end of the sleeve 29 and forced into gripping relationship therewith by means of a nut screwed on the end of the sleeve and bearing on the end face of the hub 52.

The sleeve 29, as already mentioned, is freely rotatable upon the driven shaft 28, suitable bushings being interposed between these parts. On the portion of the sleeve 29 which extends within the auxiliary casing 32 is formed or secured an eccentric 53, suitably compensated for by means of a balance weight 54 mounted on the sleeve 29 to one side of the eccentric. The remainder of the sleeve 29, extending from the eccentric towards the wall 34 of the auxiliary casing 32, is formed with flats, as shown in Fig. 12, so that an outer sleeve carrying control cams to be hereinafter referred to is capable of sliding thereon without rotating relatively thereto.

Figure 12:
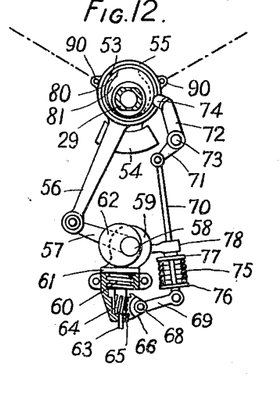
Fig. 12 is a fragmentary detail view of the form of unidirectional device incorporated in the gear.

As shown in Figs. 9 and 12 the eccentric 53 forms the inner race for a set of rollers upon which runs, acting as an outer race therefor, a ring 55 forming the big end of a connecting rod 56, the small end of which is pivotally connected to the free end of a rocking lever 57 adapted to rock about a pivot 58 journalled at its ends in the limbs of a yoke 59 secured to the auxiliary casing 32 in a downward extension of the latter.

The portion of the yoke 59 connecting the limbs thereof is adapted to act as a nut to a non-reversible screw 60 which is threaded into an internally screw-threaded aperture in said portion and carries a thrust plate 61 on its head adapted to bear on the periphery of an eccentric boss 62 secured to the rocking lever 57 at the pivoted end thereof.

A downward extension or tail-piece 63 on said screw 60 is formed with helical gear teeth 64 and is journalled in a bearing piece 65 extending downwardly from the yoke 59. The gear teeth on the tail-piece of the screw 60 are engaged by corresponding teeth formed on the arcuate periphery of a sector-shaped rocker arm 66 formed integrally with a sleeve 67, (Fig. 9) mounted to rock on a shaft 68 suitably secured in the casing 32 transversely to the axis of the screw 60.

On the sleeve 67 carrying the rocker arm 66 is further formed a rocker lever 69, off-set somewhat in relation to the arm 66, and to the outer end of said rocker lever is pivotally connected the one end of a pusher rod 70, the other end of which is pivoted to one arm 71 of a two-armed rocker lever 71, 72 which is pivoted on a pin 73 carried by the wall 34 of the casing 32. The other arm 72 of the two-armed rocker lever carries a hardened head 74 adapted to run on the periphery or peripheries of one or other or both of two controlling cams to be hereinafter described.

A compression spring 75 is arranged around the pusher rod 70 to abut by its one end against a cup 76 secured on said rod and by its other end against a cup 77 slidable on the rod and abutting in turn against a bracket 78 formed on a limb of the yoke 59 and constituting a guide for the rod 70. The action of this spring tends to force the head 74 on the two-armed rocker lever 71, 72 into close engagement with the periphery of the control cam or cams already mentioned and, at the same time, to rock the rocker-lever 69 about the shaft 68 in such a direction that the teeth on the sector-shaped rocker arm 66 cause the non-reversible screw 60 to screw through the yoke 59 against the eccentric boss 62.

It has been mentioned above that an outer sleeve is slidable on, but not rotatable relatively to the sleeve 29 carrying the eccentric 53 and this sleeve is indicated by the reference 79 in Figs. 9 and 12. Upon the sleeve 79 are secured two cams 80 and 81 which are, in effect, similarly disposed eccentrics having corresponding opposite portions cut away from their peripheries as indicated in Fig. 12, the two mutilated eccentrics together (if considered as superimposed) forming one eccentric in outline. These cams 80 and 81 are compensated for by means of a balance weight 82 similar to that shown at 54.

The outer end of the sleeve 79 is formed with a groove 83 in which engage the ends of a fork or yoke 84. This latter is adapted to be displaced, in order to displace the sleeve 79, by means of a lever 85 pivoted in the casing 32 and formed with a nose 86 engaging between upstanding lugs 87 on a tubular boss 88 on the upper end of the fork or yoke 84, this boss sliding on a stub shaft 89 secured on the inner face of the end wall 34 of the casing 32.

Although only one system comprising a non-reversible screw 60, connecting rod 56, eccentric boss 62, rocking lever 69 and pusher rod 70, together with their associated parts, has been shown in Figs. 9 and 12 it must be understood that three of these systems are provided around the driven shaft 28 at 120° from each other. The two systems not appearing in the said Figures are identical with that shown with the single exception that the connecting rods thereof, which correspond to that marked 56, are not integral with the ring 55 but are pivotally connected thereto at the points marked 90 in Fig. 12.

It will be evident that the whole mechanism formed by the three systems referred to here corresponds with and is similar in action to the reversible unidirectional device already described with reference to Fig. 6.

Furthermore, the system comprising the rotating weights 40 and rocking lever 51 corresponds to the mass W and rocking lever NO of Fig. 1.

Hence the operation of the device described with reference to Figs. 9 to 12 will be readily appreciated from the earlier description without a further detailed description thereof being given here.

It is merely necessary to state that longitudinal displacement of the outer sleeve 79 on the sleeve 29 to the one or other of its extreme positions, by means of the lever 85, suffices to bring the one or the other of the cams 80 and 81 into operative engagement with the hardened heads 74 on the two-armed rocking levers 71, 72, thus ensuring forward or reverse rotation, as the case may be, of the driven shaft 28 for the same direction of rotation of the driving shaft 22.

An intermediate position of the sleeve 79 will cause both cams 80 and 81 to act on the said hardened heads 74 together and this results in the reversible unidirectional device controlled by said cams being rendered inoperative, whereby the driven shaft 28 is no longer rotated and the gear may be said to be in "neutral".

The supplementary device shown in Figs. 9 to 11 which comprises the brake drums 41, 41a, brake bands 43, 43a and their associated parts, is not essential to the operation of the gear shown but, when provided, its action is as follows:—

When a predetermined forward speed of rotation of the rotor 25, 25a has been attained, the centrifugal force acting on the masses 47, 47a due to their rotation about the axis of rotation of the rotor overcomes the tension in the spring 46 and displaces the masses outwardly to positions where they are disposed radially to the driven shaft.

Such displacement of the masses 47, 47a, as will readily be understood tensions the brake bands 43, 43a and applies them to the drums 41, 41a to prevent rotation thereof relatively to the rotor. The weights 40, 40a are thus held stationary relatively to the rotor and the rotation of the driving shaft 22 is transmitted directly to the driven shaft 28, the rotor 25, 25a turning en bloc with the said shafts.

If the gear is intended for application to motor vehicles however, such braking devices are unnecessary and the centrifugal force due to the rotation of the weights 40, 40a about the axis of the gear is employed to produce an equivalent effect in holding said weights stationary relatively to the rotor 25, 25a at a predetermined forward speed of the latter.

Although the gear shown in Figs 9 to 12 embodies a reversible unidirectional device it may be preferred, in some cases, to employ in the place thereof a novel device of the character described in connection with Figs. 7 and 8.

Figure 13:
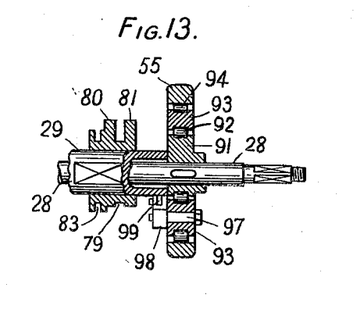
Fig. 13 is a further fragmentary detail view, partly in section, showing an alternative arrangement of some of the parts.
Figures 14, 15:
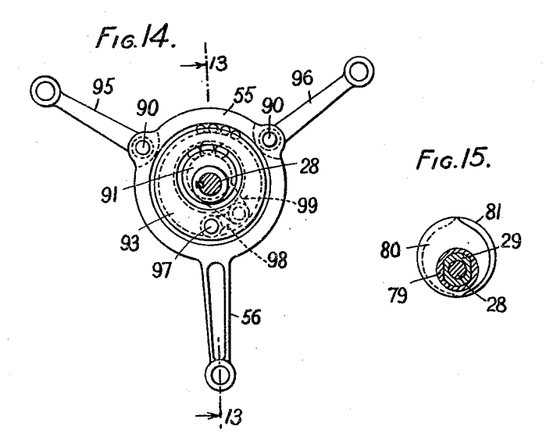
Fig. 14 is an end elevation of Fig. 13.
Fig. 15 is a detail view showing control cams employed in connection with the unidirectional devices.

The modifications rendered necessary in the gear in order to enable this substitution to be effected are of but a slight character and the detail views of Figs. 13 to 15 will suffice to render clear the nature of such modifications.

Similar reference characters are employed in these views to indicate corresponding parts.

Figure 11:
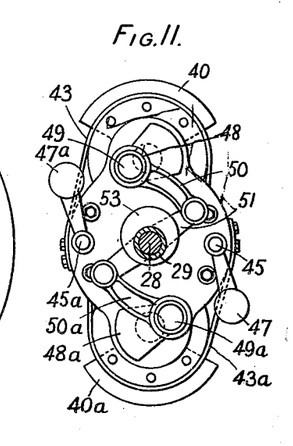
Fig. 11 is a similar view taken on the line 11—11 of Fig. 9, some parts being omitted and the casing supposedly removed.

It will be seen that the single eccentric marked 53 in Figs. 9, 11 and 12 is replaced by a pair of eccentrics 91, 93, the inner one 91 being secured on the driven shaft 28. This necessitates the rearrangement of the cams 80 and 81 and their sleeve 79 on the sleeve 29 between the bearing 30 therefor and the outer end thereof (referring back to Fig. 9). Such rearrangement does not affect the operation of these parts, merely calling for corresponding alterations in the positions of the pusher rods 70 and their associated parts.

Surrounding the eccentric 91 is a race of rollers 92 supporting the outer eccentric 93, which in turn supports on a race of rollers 94 the ring 55 forming the big end of the connecting rod 56, the other connecting rods 95 and 96 being pivoted to said ring at 90, 90 in the manner before described in connection with the unidirectional device. At their small ends these connecting rods are associated with non-reversible screws, rocking levers etc. such as described in connection with Figs. 9 to 12.

The outer eccentric 93 is connected by means of a pin 97 and connecting link 98 with a crank arm 99 secured on the outer end of the sleeve 29, which, as will be understood, is again rigidly connected with the rocking lever 51 of Fig. 11.

Fig. 15 is a detail view showing the arrangement of the cams 80 and 81 so as to be slidable on the sleeve 29.

Now, although the relative positions of the eccentrics connected to the sleeve and to the driven member, respectively, have been reversed when considered in connection with Figs. 7 and 8, it will be understood that the action thereof will be identical with that of those eccentrics shown in said figures.

Hence a reverse rotation of the outer eccentric 93 relatively to the inner eccentric 91 will be resolved into a radial thrust on the latter urging same in the forward direction.

The general operation of the gear when modified in accordance with Figs. 13 and 14 is the same as that of the gear when constructed in accordance with Figs. 9 to 12, an additional advantage being offered, however, in that the rocking lever 51 is allowed a limited reverse movement during those periods in which it was formerly held stationary this reverse movement being utilized in producing a forward impulse on the driven shaft. A source of possible shocks is thus obviated and furthermore, when the gear is running in "direct drive" the double eccentric system rotates as a simple disc due to the eccentrics assuming their neutral position, in which the total eccentricity is nil. Hence the connecting rod systems (56, 95, 96) remain stationary during direct drive.

It must be understood that the constructions hereinbefore described are to be considered as examples only and that various other constructions may be employed within the scope of the appended claims.

I claim:—

1. Means for converting and transmitting torque comprising a rotating driving shaft, a rotatable driven shaft in alignment with said driving shaft, a rotor member secured on said driven shaft to rotate co-axially therewith, short shafts mounted rotatably in said rotor member symmetrically to and parallel with the axis of rotation thereof, an unbalanced inertia mass fixedly secured on each of said short shafts to rotate therewith, a driven gear wheel keyed on each of said short shafts in intermeshing relation with a driving gear wheel secured on the driving shaft, a crank arm secured on each of said short shafts, a crank pin on said crank arm, and a connecting rod pivoted by its one end on said crank pin and pivotally connected by its other end with a rocking member which is free to move in one direction but meets with resistance when it tends to move in the opposite direction.

2. Means for converting and transmitting torque according to claim 1, wherein the rocking member comprises a rocking lever secured on a sleeve oscillatably mounted on the driven shaft, said sleeve having associated therewith means adapted to convert the oscillatory motion of the sleeve into a reciprocatory motion of an element which is capable of free movement in one direction only.

3. Means for converting and transmitting torque, according to claim 1, wherein the rocking member comprises a rocking lever secured on a sleeve oscillatably mounted on the driven shaft, including means secured on said sleeve for converting the oscillatory motion thereof into a reciprocatory motion of an element which is normally free to move in the one direction but is held stationary when it tends to move in the other direction, and means for rendering said element free to move in both directions when desired.

4. Means for converting and transmitting torque according to claim 1, the rocking member comprising a rocking lever secured on a sleeve oscillatably mounted on the driven shaft, including means secured on said sleeve for converting the oscillatory motion thereof into a reciprocatory motion of a connecting rod, a member pivotally attached to the free end of said rod and means for rendering said member incapable of free movement in the one of its directions of movement when desired.

5. Means for converting and transmitting torque comprising a rotating driving shaft, a rotatable driven shaft in alignment with said driving shaft, a rotor member secured on said driven shaft to rotate co-axially therewith, short shafts mounted rotatably in said rotor member symmetrically to and parallel with the axis of rotation thereof, an unbalanced inertia mass fixedly secured on each of said short shafts to rotate therewith, a driven gear wheel keyed on each of said short shafts in intermeshing relation with a driving gear wheel secured on the driving shaft, a crank arm secured on each of said short shafts, a crank pin on said crank arm, a connecting rod pivoted by its one end on said crank pin and pivotally connected by its other end with the outer end of a rocking lever, a sleeve oscillatably mounted on the driven shaft and having secured thereon the inner end of said rocking lever, an eccentric member secured to said sleeve to oscillate therewith, means for converting the oscillatory movements of the eccentric member into reciprocatory movements of a connecting rod, a rocking lever pivotally connected by its one end with the free end of said connecting rod, a pivot for the other end of said rocking lever, an eccentric rigidly connected with the pivoted end of said lever to be oscillated thereby about the said pivot, a fixed nut, a non-reversible screw threaded in said nut to bear by its one end face on the periphery of said eccentric, spring means tending to rotate said screw in a direction to cause said end face thereof to press on the periphery of the eccentric and cam-controlled means for rotating said screw in a direction to cause the end face thereof to recede from the periphery of the eccentric.

6. Means for converting and transmitting torque according to claim 5, wherein the means for converting the oscillatory movements of the eccentric member secured to the sleeve into reciprocatory movements of the connecting rod comprise a roller bearing surrounding said eccentric member and a big end on said rod rotatably mounted on said eccentric member.

7. Means for converting and transmitting torque according to claim 5, wherein the eccentric member secured to the oscillatably mounted sleeve is mounted freely on an eccentric secured to the driven shaft to rotate therewith.

8. Means for converting and transmitting torque according to claim 5, including a non-reversible screw formed with a tail-piece having helical teeth, a toothed segment engaging said teeth, a rocking arm adapted to displace said segment relatively to said tail-piece in order to cause rotation of the latter, a push-rod pivotally connected with said rocking arm, a spring urging said push-rod in a direction to cause the screw to follow up the eccentric, a cam connected with the sleeve mounted on the driven shaft to rotate therewith and a follower running in contact with said cam to be displaced thereby at definite intervals in order to urge the push-rod in a direction to cause the screw to recede from the eccentric.

9. Means according to claim 5, wherein the cam-controlled means comprises two cams of similar but inverse profiles, mounted upon the sleeve on the driven shaft so as to rotate therewith but to be capable of movement longitudinally thereof, longitudinal movement of said cams bringing them in succession to positions where the one alone, both and the other alone operate to cause the screw to recede from the eccentric, these positions corresponding, respectively, to forward, neutral and reverse operation of the torque converter and transmitter.

10. Means for converting and transmitting torque comprising a rotating driving shaft, a rotatable driven shaft, a rotor member secured on said driven shaft to rotate co-axially therewith, short shafts mounted rotatably in said rotor member symmetrically to and parallel with the axis of rotation thereof, an unbalanced inertia mass fixedly secured on each of said short shafts to rotate therewith, a rocking member mounted for free movement in one direction, means for offering a resistance to the movement of said rocking member when it tends to move in a direction opposite to that in which it is freely movable, driving means actuated by the driving shaft for rotating said short shafts, a crank arm secured on each of said short shafts, a crank pin on said crank arm, and a connecting rod pivoted at one end on said crank pin and pivotally connected at its other end with the said rocking member.

11. Means for converting and transmitting torque comprising a rotating driving shaft, a rotatable driven shaft, a rotor member secured on said driven shaft, unbalanced inertia masses pivotally mounted on said rotor member, driving means actuated by said driving shaft to cause movement of said masses about their pivots, and means comprising a lever system associated with the pivots of said masses for alternately allowing and resisting the movements of the latter about said pivots during periods occurring in definite timed relationship with the said movements so that during the free-movements, torques are produced on the driven member by the direct application thereto of the centrifugal forces due to these movements, and, during the impeded movements, similarly directed torques are produced by the driving member acting through the said lever system on the driven member.

In testimony whereof he has affixed his signature.

ACHILLE DEMOCRATIS.